United States Patent
Daivajna (10) Patent No.: US 10,994,512 B2
(45) Date of Patent: May 4, 2021

(54) HYBRID COMPOSITE TUBE SYSTEMS AND METHODS

(71) Applicant: GOODRICH AEROSPACE SERVICES PRIVATE LIMITED, Bangalore (IN)

(72) Inventor: Sandeep Daivajna, Sagar (IN)

(73) Assignee: GOODRICH AEROSPACE SERVICES PRIVATE LIMITED, Bengaluru (IN)

( * ) Notice: Subject to any disclaimer, the term of this patent is extended or adjusted under 35 U.S.C. 154(b) by 207 days.

(21) Appl. No.: 16/389,619

(22) Filed: Apr. 19, 2019

(65) Prior Publication Data
US 2020/0282697 A1 Sep. 10, 2020

(30) Foreign Application Priority Data
Mar. 8, 2019 (IN) .............................. 201941009135

(51) Int. Cl.
| F16L 9/14 | (2006.01) |
| B32B 5/26 | (2006.01) |
| B32B 1/08 | (2006.01) |
| B32B 5/02 | (2006.01) |
| F16L 11/08 | (2006.01) |

(52) U.S. Cl.
CPC .................. *B32B 5/26* (2013.01); *B32B 1/08* (2013.01); *B32B 5/02* (2013.01); *F16L 11/08* (2013.01); *B32B 2255/02* (2013.01); *B32B 2260/021* (2013.01); *B32B 2260/046* (2013.01); *B32B 2262/101* (2013.01); *B32B 2307/304* (2013.01); *B32B 2597/00* (2013.01)

(58) Field of Classification Search
USPC ......................................... 138/139, 143, 149
See application file for complete search history.

(56) References Cited

U.S. PATENT DOCUMENTS

| 4,137,949 A | 2/1979 | Linko, III et al. |
| 5,182,147 A | 1/1993 | Davis |
| 5,236,018 A * | 8/1993 | Kobayashi ............ B29C 53/585 138/109 |
| 7,153,465 B1 | 12/2006 | Schwab et al. |
| 7,858,879 B2 | 12/2010 | Herborth et al. |
| 8,147,937 B2 | 4/2012 | Brisson et al. |
| 8,883,060 B2 | 11/2014 | Nakamura et al. |
| 8,991,437 B2 | 3/2015 | Bourlart |
| 9,939,222 B1 | 4/2018 | Mulligan et al. |

(Continued)

FOREIGN PATENT DOCUMENTS

JP    2003028347    1/2003

OTHER PUBLICATIONS

European Patent Office, European Search Report dated Jun. 24, 2020 in Application No. 20154671.0.

*Primary Examiner* — Patrick F Brinson
(74) *Attorney, Agent, or Firm* — Snell & Wilmer L.L.P.

(57) ABSTRACT

A hybrid composite tube includes a metallic tube, a first silica fiber layer positioned radially of the metallic tube, a fiber reinforced polymer layer positioned radially of the first silica fiber layer, and a second silica fiber layer positioned radially of the fiber reinforced polymer layer, wherein the first silica fiber layer thermally insulates the fiber reinforced polymer layer and the second silica fiber layer thermally insulates the fiber reinforced polymer layer.

20 Claims, 3 Drawing Sheets

(56) References Cited

U.S. PATENT DOCUMENTS

| | | |
|---|---|---|
| 2005/0011560 A1 | 1/2005 | Anderson et al. |
| 2005/0208851 A1 | 9/2005 | Gooliak |
| 2008/0138553 A1 | 6/2008 | Lauer et al. |
| 2010/0126617 A1* | 5/2010 | Stroempl .............. F16L 11/125 138/137 |
| 2011/0000572 A1* | 1/2011 | Ramaswamy ............ B32B 5/22 138/149 |
| 2016/0084140 A1* | 3/2016 | Dietz .................... D04H 3/002 138/149 |

* cited by examiner

HYBRID COMPOSITE TUBE SYSTEMS AND METHODS

CROSS REFERENCE TO RELATED APPLICATION

This application claims priority to and the benefit of India patent application No. 201941009135 filed on Mar. 8, 2019 and entitled "HYBRID COMPOSITE TUBE SYSTEMS AND METHODS," which is incorporated by reference herein in its entirety.

FIELD

The present disclosure relates generally to tubes, and more specifically to hybrid composite tubes.

BACKGROUND

Various engines, such as a gas turbine engine, include ducts for transporting fluids, including hydraulic fluids, oil, fuel, and waste fluid, among others. These ducts may be disposed in moderate to high-temperature environments. Furthermore, these ducts may carry high-pressure fluids. Typically, these ducts are made entirely of metal in order to withstand the temperatures and pressures associated with engine environments.

SUMMARY

A hybrid composite tube is disclosed, comprising a metallic tube, a first silica fiber layer positioned radially of the metallic tube, a fiber reinforced polymer layer positioned radially of the first silica fiber layer, and a second silica fiber layer positioned radially of the fiber reinforced polymer layer, wherein the first silica fiber layer thermally insulates the fiber reinforced polymer layer and the second silica fiber layer thermally insulates the fiber reinforced polymer layer.

In various embodiments, the metallic tube, the first silica fiber layer, the fiber reinforced polymer layer, and the second silica fiber layer, are concentric.

In various embodiments, the first silica fiber layer surrounds the metallic tube, the fiber reinforced polymer layer surrounds the first silica fiber layer, and the second silica fiber layer surrounds the fiber reinforced polymer layer.

In various embodiments, the first silica fiber layer thermally insulates the fiber reinforced polymer layer from the metallic tube.

In various embodiments, the first silica fiber layer and/or the second silica fiber layer protects the fiber reinforced polymer layer from thermal combustion.

In various embodiments, the first silica fiber layer comprises a silica fabric.

In various embodiments, the second silica fiber layer comprises a plurality of glass fibers coated in a silicone rubber.

In various embodiments, the second silica fiber layer comprises a silica fabric.

In various embodiments, the fiber reinforced polymer layer comprises at least one of a glass fiber reinforced epoxy and a carbon fiber reinforced epoxy.

In various embodiments, the hybrid composite tube is at least twenty five percent lighter than a fully metallic tube of similar strength.

In various embodiments, the fiber reinforced polymer layer comprises a plurality of fibers oriented at an angle with respect to a tube axis.

In various embodiments, the second silica fiber layer comprises a wall-thickness which varies along a long a tube axis to vary a thermal insulation property of the second silica fiber layer.

A hybrid composite tube is disclosed, comprising a metallic tube, a first silica fiber layer positioned radially of the metallic tube, a fiber reinforced polymer layer positioned radially of the first silica fiber layer, and a second silica fiber layer positioned radially of the fiber reinforced polymer layer.

In various embodiments, the first silica fiber layer surrounds the metallic tube and the fiber reinforced polymer layer surrounds the first silica fiber layer.

In various embodiments, the second silica fiber layer surrounds the fiber reinforced polymer layer.

In various embodiments, the metallic tube, the first silica fiber layer, the fiber reinforced polymer layer, and the second silica fiber layer, are concentric.

In various embodiments, the hybrid composite tube comprises at least one of a round geometry, an ovular geometry, and a polygonal geometry.

In various embodiments, the hybrid composite tube is configured to carry a hot fluid.

In various embodiments, the first silica fiber layer comprises a wall-thickness of between 15% and 45% of a total wall-thickness of the hybrid composite tube.

In various embodiments, the second silica fiber layer comprises a wall-thickness of between 5% and 30% of a total wall-thickness of the hybrid composite tube.

In various embodiments, the fiber reinforced polymer layer comprises a wall-thickness of between 30% and 80% of a total wall-thickness of the hybrid composite tube.

In various embodiments, the metallic tube comprises a wall-thickness of between 10% and 50% of a total wall-thickness of the hybrid composite tube.

A method for forming a hybrid composite tube is disclosed, comprising disposing a first silica fiber layer about a metallic tube, disposing a fiber reinforced polymer layer about the first silica fiber layer, and disposing a second silica fiber layer about the fiber reinforced polymer layer.

In various embodiments, the method further comprises co-curing the first silica fiber layer and the fiber reinforced polymer layer.

In various embodiments, the method further comprises co-curing the first silica fiber layer, the fiber reinforced polymer layer, and the second silica fiber layer.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

The present disclosure describes composite components having a metallic tube and a hybrid composite outer tube formed thereon. A composite may comprise a polymer matrix composite. The composite may comprise a polymer matrix composite reinforced by fibers such as a carbon, glass, organic fibers, or combinations thereof. Such hybrid metallic/composite arrangements may be used in aircraft systems, such as, for example, power plant systems. However, the systems and methods of the present disclosure may be suitable for use in non-aircraft systems as well.

In various embodiments, a hybrid metallic/composite arrangement of the present disclosure may be useful for various components including, but not limited to, hydraulic lines, oil lines, fuel lines, drain waste lines, etc.

In various embodiments, a hybrid composite outer layer, as disclosed herein, may include a fiber-reinforced polymer (FRP) layer thermally insulated by two silica fiber layers. The FRP layer may be sandwiched between the silica fiber layers. In this regard, the FRP layer is thermally insulated from the metallic tube, as well as radiating heat from nearby components. By thermally insulating the FRP layer, the hybrid composite tube may withstand elevated temperature environments. Thermally insulating the FRP layer may prevent the FRP layer from softening and/or degradation of mechanical properties of the FRP layer. Thermally insulating the FRP layer may prevent the FRP layer from thermal combustion and/or generating smoke. Furthermore, hybrid composite tubes of the present disclosure may increase tube strength, while decreasing overall tube weight.

Figure 1A:
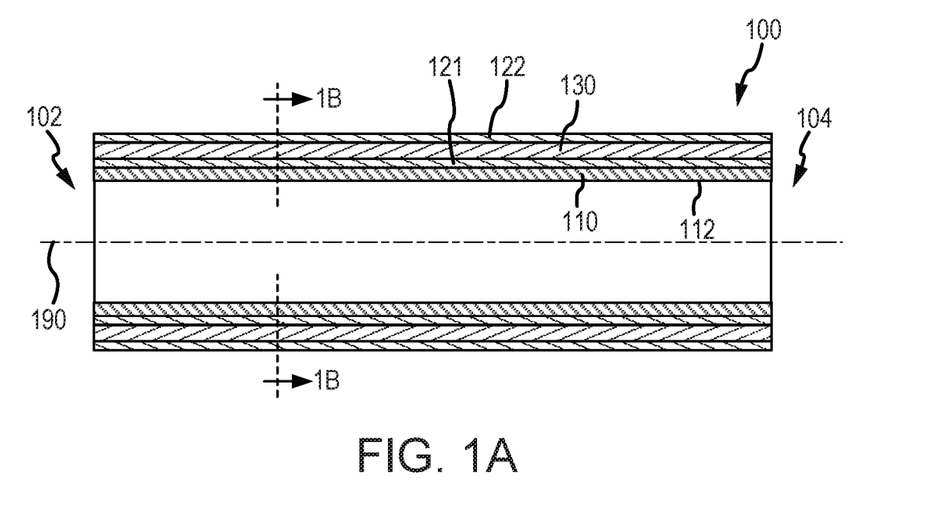
FIG. 1A illustrates a section side view of a hybrid composite tube, in accordance with various embodiments.

With reference to FIG. 1A, a section view of a hybrid composite tube 100 (also referred to herein as a tube or a duct) is illustrated, in accordance with various embodiments. Tube 100 may extend longitudinally between a first end 102 and a second end 104 along a centerline axis 190. Although illustrated as being straight, centerline axis 190 may also be curved, in accordance with various embodiments. An inner surface 112 may be configured to direct a fluid through tube 100. In various embodiments, inner surface 112 defines an inner diameter of tube 100.

Figure 1B:
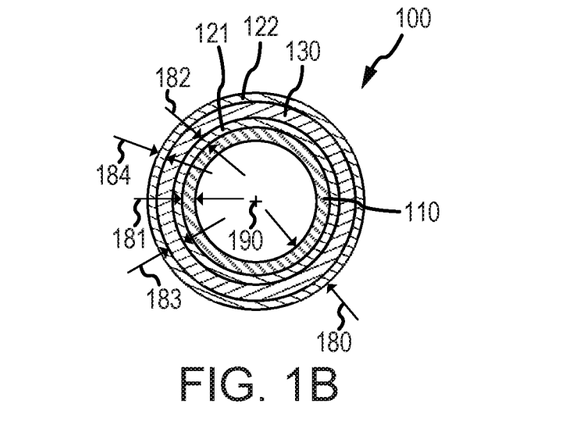
FIG. 1B illustrates a section longitudinal view of the hybrid composite tube of FIG. 1A, in accordance with various embodiments.

With additional reference to FIG. 1B, a section view, viewed along centerline axis 190, is illustrated, in accordance with various embodiments. Tube 100 may comprise a round profile as illustrated in FIG. 1B. However, tube 100 may also comprise an elliptical, a polygonal, or any other suitable profile. In this regard, tube 100 may be a round tube, an ovular tube, a square tube, a polygonal-shaped tube, or any other suitable shape tube. In various embodiments, the shape of tube 100 may be configured dependent upon the type of fluid disposed therein. For example, tube 100 may be formed as a round tube in order to withstand high pressure fluids. Furthermore, tube 100 may be formed as a single, continuous tube having multiple bends and irregular geometry.

In various embodiments, tube 100 comprises a metallic tube 110. Metallic tube 110 may be comprised of a metal including, but not limited to, iron, cobalt, nickel, copper, aluminum, titanium, chromium, vanadium, molybdenum, tantalum, tungsten, niobium, etc. as well as alloys thereof, including, but not limited to, stainless steel, nickel-based super alloys, refractory alloys, etc. Metallic tube 110 may be manufactured using any suitable manufacturing technique.

In various embodiments, tube 100 further comprises a silica fiber layer 121 (also referred to herein as a first silica fiber layer). Silica fiber layer 121 may be wrapped around metallic tube 110. In this regard, silica fiber layer 121 may be formed as a tube enclosing metallic tube 110. Silica fiber layer 121 may be configured as a thermally insulating layer.

In various embodiments, silica fiber layer 121 comprises a silica fabric wrapped around metallic tube 110. Silica fiber layer 121 may comprise a silica fabric comprising a woven yarn that is composed of silica. Silica fiber layer 121 may comprise a silica fabric comprising a woven yarn that is composed of more than 95% silica. Silica fiber layer 121 may comprise high strength amorphous silica fibers. Silica fiber layer 121 may comprise silica fabric rated to withstand temperatures of 1652° F. (900° C.) or more on a continuous basis. Silica fabric may comprise a low thermal conductivity. In various embodiments, silica fiber layer 121 comprises a thermal conductivity of less than 1 W/mk (6.93 Btu in./hr/ft$^{2}$° F.). Silica fabric may be resistant to corrosive agents and chemical reagents.

In various embodiments, silica fiber layer 121 comprises a fiberglass cloth impregnated with a heat-resistant silicone rubber compound. Stated differently, silica fiber layer 121 may comprise a silicone rubber coated fiberglass cloth. Stated differently, silica fiber layer 121 may comprise a plurality of glass fibers coated in silicone rubber. Silica fiber layer 121 may comprise fiberglass cloth impregnated with a heat-resistant silicone rubber rated to withstand temperatures of 500° F. (260° C.) or more on a continuous basis. In this regard, silica fiber layer 121 may comprise a heat-resilient material. Furthermore, silica fiber layer 121 may provide flame retardation to tube 100. Additionally, silica fiber layer 121 may provide a moisture barrier to tube 100. Further, silica fiber layer 121 may be resistant to abrasion.

In various embodiments, tube 100 further comprises a fiber-reinforced polymer (FRP) layer 130. FRP layer 130 may be wrapped around silica fiber layer 121. In this regard, FRP layer 130 may be formed as a tube enclosing silica fiber layer 121. Metallic tube 110 may carry or route a hot fluid. The hot fluid may reach temperatures of up to 500° F. (260° C.) or more on a continuous basis. In this regard, silica fiber layer 121 may thermally insulate FRP layer 130 from metallic tube 110. Silica fiber layer 121 may protect FRP layer 130 from thermal combustion and/or generating smoke. Silica fiber layer 121 may tend to maintain FRP layer 130 below a predetermined temperature to prevent thermal combustion and/or generation of smoke by FRP layer 130. In various embodiments, FRP layer 130 comprises a glass fiber reinforced epoxy. In various embodiments, FRP layer 130 comprises a carbon fiber reinforced epoxy. FRP layer 130 may be configured to transfer structural loads through tube 100. FRP layer 130 may be tailored to provide a pre-determined hoop strength for tube 100. FRP layer 130 may be tailored to provide a pre-determined stiffness for tube 100. For example, a wall-thickness of FRP layer 130 may be tailored for pre-determined load ratings (e.g., circumferential stress, bending stress, axial forces, torsion, internal pressure, etc.) depending on the desired use of tube 100.

In various embodiments, tube 100 further comprises a silica fiber layer 122 (also referred to herein as a second silica fiber layer). Silica fiber layer 122 may be similar to silica fiber layer 121. Silica fiber layer 122 may be wrapped around FRP layer 130. In this regard, silica fiber layer 122 may be formed as a tube enclosing FRP layer 130. Silica fiber layer 122 may thermally insulate FRP layer 130 from heat transmitted externally from tube 100, for example heat radiating from a component adjacent tube 100. Silica fiber layer 122 may protect FRP layer 130 from thermal combustion and/or generating smoke. Silica fiber layer 122 may tend to maintain FRP layer 130 below a predetermined temperature to prevent thermal combustion and/or generation of smoke by FRP layer 130. It is contemplated herein that a shrinkable plastic material may be provided over silica fiber layer 122 to protect silica fiber layer 122 from abrasion. Furthermore, silica fiber layer 122 may be abrasion resistant.

In various embodiments, silica fiber layer 122 comprises a fiberglass cloth impregnated with a heat-resistant silicone rubber compound. Stated differently, silica fiber layer 122 may comprise a silicone rubber coated fiberglass cloth. Stated differently, silica fiber layer 122 may comprise a plurality of glass fibers coated in silicone rubber.

In various embodiments, silica fiber layer 122 comprises the silicone rubber coated fiberglass cloth and silica fiber layer 121 comprises the silica fabric. In this regard, silica fiber layer 122 may comprise a different material from silica fiber layer 121. In various embodiments, both silica fiber layer 122 and silica fiber layer 121 each comprise a silica fabric. In this regard, silica fiber layer 122 may comprise a similar material as silica fiber layer 121.

Table 1 below provides the natural frequency, deflection, and weight savings of hybrid composite tubes in rows 3-9, in comparison to an entirely metallic tube, in row 1, and tube comprised entirely of glass fiber reinforced epoxy in row 2. While maintaining a constant wall-thickness, as the wall-thickness of the metallic tube is increased, and consequently the wall-thickness of the glass fiber reinforced polymer layer is decreased, the natural frequency and stiffness of the hybrid composite tube increases, while the overall weight savings decreases, and vice versa. Therefore, the ratio of wall thickness between the metallic tube 110 and the FRP layer 130 may be varied in accordance with desired weight savings and strength requirements. Furthermore, as shown in table 1, a hybrid composite tube of the present disclosure (e.g., tube 100) is lighter than an entirely metallic tube, while maintaining bending load deflection, natural frequency, and burst pressure displacement similar to that of an entirely metallic tube. Hybrid composite tubes of the present disclosure (e.g., tube 100) may be capable of carrying pressurized fluids pressurized up to about 4,500 psi (31,026 kPa) or more, as well as non-pressurized fluids. Furthermore, as shown in table 1, hybrid composite tubes of the present disclosure (e.g., tube 100) may be at least 25% lighter than a fully metallic tube of similar strength.

TABLE 1

Tube Thickness Comparison (% wall-thickness)

| No | Name | Weight (Kg) | Natural Frequency(Hz) | Bending load Deflection in mm | Burst Pressure Displacement (mm) | Weight Saving |
|----|------|-------------|-----------------------|-------------------------------|----------------------------------|---------------|
| 1 | Metallic Tube (100%) | 0.343 | 299.87 | 0.17 | 0.51 | — |
| 2 | Composite Tube(Glass Fiber Reinforced Epoxy) (100%)*2 | 0.149 | 135.63 | 2.30 | 3.85 | 56.59% |
| 3 | [Steel (12%) + 1st Silica Fiber (33%) + GFRP (44%) + 2nd Silica Fiber (11%)] | 0.185 | 240.83 | 0.85 | 0.98 | 45.97% |
| 4 | [Steel (20%) + 1st Silica Fiber (33%) + GFRP (36%) + 2nd Silica Fiber (11%)] | 0.210 | 253.67 | 0.63 | 0.73 | 38.68% |
| 5 | [Steel (25%) + 1st Silica Fiber (33%) + GFRP (31%) + 2nd Silica Fiber (11%)] | 0.235 | 263.85 | 0.50 | 0.57 | 31.39% |
| 6 | [Steel (30%) + 1st Silica Fiber (33%) + GFRP (26%) + 2nd Silica Fiber (11%)] | 0.270 | 269.40 | 0.40 | 0.47 | 21.38% |

TABLE 1-continued

Tube Thickness Comparison (% wall-thickness)

| No | Name | Weight (Kg) | Natural Frequency(Hz) | Bending load Deflection in mm | Burst Pressure Displacement (mm) | Weight Saving |
|---|---|---|---|---|---|---|
| 7 | [Steel (35%) + 1st Silica Fiber (33%) + GFRP (21%) +2nd Silica Fiber (11%)] | 0.294 | 278.02 | 0.34 | 0.41 | 14.12% |
| 8 | [Steel (41%) + 1st Silica Fiber (33%) + GFRP (15%) + 2nd Silica Fiber (11%)] | 0.319 | 285.90 | 0.29 | 0.36 | 6.83% |

In various embodiments, the wall-thickness 181 of metallic inner layer 110 is between 10% and 50% of the total wall-thickness 180 of tube 100. In various embodiments, the wall-thickness 181 of metallic inner layer 110 is between 10% and 40% of the total wall-thickness 180 of tube 100. In various embodiments, the wall-thickness 183 of FRP layer 130 is between 30% and 80% of the total wall-thickness 180 of tube 100. In various embodiments, the wall-thickness 183 of FRP layer 130 is between 40% and 70% of the total wall-thickness 180 of tube 100. In various embodiments, the wall-thickness 182 of silica fiber layer 121 is between 15% and 45% of the total wall-thickness 180 of tube 100. In various embodiments, the wall-thickness 182 of silica fiber layer 121 is between 20% and 40% of the total wall-thickness 180 of tube 100. In various embodiments, the wall-thickness 184 of silica fiber layer 122 is between 5% and 30% of the total wall-thickness 180 of tube 100. In various embodiments, the wall-thickness 184 of silica fiber layer 122 is between 10% and 25% of the total wall-thickness 180 of tube 100.

Figure 2:
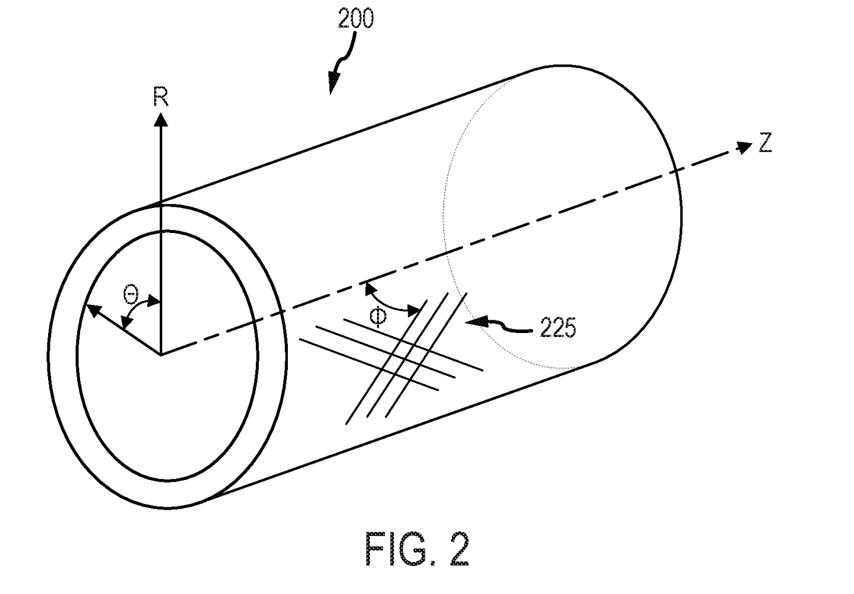
FIG. 2 illustrates a perspective view of a hybrid composite tube comprising fibers oriented at an angle with respect to the tube axis, in accordance with various embodiments.

With reference to FIG. 2, a perspective view of a hybrid composite tube 200 (also referred to herein as a tube or a duct) is illustrated, in accordance with various embodiments. Hybrid composite tube 200 may be similar to hybrid composite tube 100 of FIG. 1A. The radial, R, hoop, Φ, and axial, Z, directions are provided in FIG. 2 as cylindrical coordinates. In various embodiments, an orientation of fibers 225 are illustrated at an angle, Φ, with respect to the tube axis (i.e., the Z-direction). In various embodiments, angle Φ is between twenty and eighty degrees (20-80°). In various embodiments, angle Φ is between fifty and sixty-three degrees (50-63°). In various embodiments, angle Φ is about fifty-five degrees (55°), wherein the term "about" as used in this context mean plus or minus three degrees (±3). In various embodiments, fibers 225 represent the fibers of FRP layer 130 of FIG. 1A and FIG. 1B. In this regard, with momentary reference to FIG. 1A and FIG. 1B, FRP layer 130 may comprise glass fibers (e.g., fibers 225) oriented at angle Φ. The orientation of fibers 225 may be tailored to achieve a desired hoop strength of tube 200. The burst strength of tube 200 may be increased by orienting fibers 225 at angle Φ.

Figure 3:
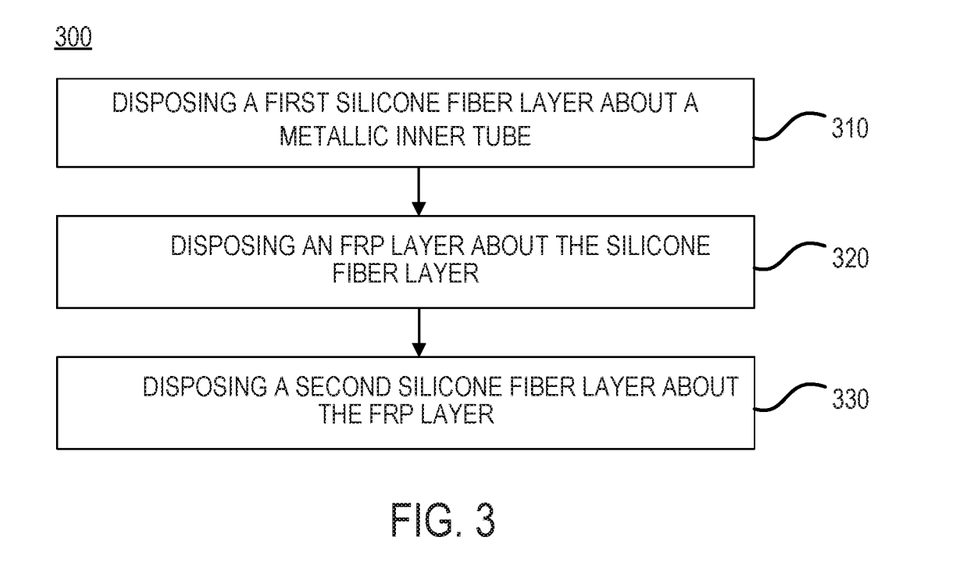
FIG. 3 provides a method for forming a hybrid composite tube, in accordance with various embodiments.

With reference to FIG. 3, a method 300 for forming a hybrid composite tube is provided, in accordance with various embodiments. Method 300 includes disposing a first silica fiber layer about a metallic tube (step 310). Method 300 includes disposing an FRP layer about the silica fiber layer (step 320). Method 300 includes disposing a second silica fiber layer about the FRP layer (step 330).

With combined reference to FIG. 1A and FIG. 3, step 310 may include disposing silica fiber layer 121 about metallic tube 110. In various embodiments, silica fiber layer 121 is wrapped around metallic tube 110 using a filament winding process. The fibers of silica fiber layer 121 may be oriented appropriately during the filament winding process (e.g., either helical or hoop winding). Each layer of fibers may be varied in stacking sequence to orient fibers in a crisscross pattern. A fiber to matrix ratio of between 50% to 80% may be maintained for silica fiber layer 121 for maximizing insulation properties.

Silica fiber layer 121 may be formed by winding silica fiber threads impregnated with a resin onto the surface of a mandrel (i.e., metallic tube 110). The entire assembly may then be passed through a resin curing furnace in order to cure the silica fiber layer to the mandrel (i.e., bonds silica fiber layer 121 to the metallic tube 110). The curing heat (supply of hot air) may convert the liquid resin to a solid resin and bond the silica fibers of silica fiber layer 121 to the metallic tube 110. In various embodiments, silica fiber layer 121 is cured using a curing agent (hardener), such as a hydrogen-containing compound, an anionic or cationic initiator, or a reactive cross-linker.

In various embodiments, silica fiber layer 121 is wrapped around metallic tube 110 using a roll wrapping process. In a roll wrapping process, the silica fabric may be cut into patterns and is impregnated with a binder such as an epoxy resin or polymide resin. The patterns may be wrapped, for example in alternating directions, onto metallic tube 110. The part may then be cured by applying heat to the part. For example, silica fiber layer 121 may be formed from silicone impregnated cloth wrapped around metallic tube 110. In various embodiments, heat is applied to silica fiber layer 121 to harden silica fiber layer 121 during the curing process. Metallic tube 110 may serve as a mandrel during step 310. Furthermore, silica fiber layer 121 may be formed as a single, continuous tube having multiple bends and irregular geometry during step 310.

Step 320 may include includes disposing FRP layer 130 about silica fiber layer 121. FRP layer 130 may be disposed about silica fiber layer 121 in a similar manner as silica fiber layer 121 is disposed about metallic tube 110. FRP layer 130 may be disposed about silica fiber layer 121 in a filament winding process or a pre-preg roll wrapping process. Each layer of fibers may be carried in stacking sequence to orient the fibers of FRP layer 130 as desired during the filament winding process, thereby tailoring tube 100 to handle specific loading. Each layer of fibers may be varied in stacking sequence to orient the fibers in a crisscross pattern.

In various embodiments, FRP layer 130 is formed by winding glass or carbon threads impregnated with a thermosetting resin onto the exposed surface of silica fiber layer 121 to be multilayered thereon. After achieving required thickness, the entire assembly may then passed through a resin curing furnace in order to cure FRP layer 130. The curing heat (e.g., supply of hot air) converts the liquid (or semi-liquid) resin to a solid resin which bonds the each layer of reinforcement fiber. In various embodiments, fiber reinforced layer 130 is cured using a curing agent (hardener), such as a hydrogen-containing compound, an anionic or cationic initiator, or a reactive cross-linker.

In various embodiments, fiber reinforced layer 130 is wrapped around silica fiber layer 121 using a pre-preg roll wrapping process. In a pre-preg roll wrapping process, the pre-preg roll may be cut into patterns with specific fiber orientations. The patterns may be rolled onto silica fiber layer 121 and then wrapped with a thin plastic film (flexible diaphragm) and placed in an autoclave. With application of heat and pressure the parts are cured and helps to minimize resin voids and to achieve the desired resin/fiber ratio. In various embodiments, heat is simultaneously applied to silica fiber layer 121 and FRP layer 130, wherein fiber layer 121 and FRP layer 130 are co-cured.

Step 330 may include includes disposing silica fiber layer 122 about FRP layer 130. Silica fiber layer 122 may be disposed about FRP layer 130 in a similar manner as silica fiber layer 121 is disposed about metallic tube 110. Silica fiber layer 122 may be disposed about FRP layer 130 in a pre-preg roll wrapping process. Silica fiber layer 122 may be bonded to FRP layer 130. In various embodiments, heat is simultaneously applied to silica fiber layer 121, FRP layer 130, and silica fiber layer 122, wherein fiber layer 121, FRP layer 130, and silica fiber layer 122 are co-cured. In various embodiments, silica fiber layer 122, wherein fiber layer 121, FRP layer 130, and/or silica fiber layer 122 are cured using a curing agent (hardener), such as a hydrogen-containing compound, an anionic or cationic initiator, or a reactive cross-linker.

In various embodiments, method 300 further includes forming metallic tube 110. Metallic tube 110 may be formed using additive manufacturing techniques, negative manufacturing techniques, and/or casting.

In various embodiments, FRP layer 130 may comprise a polymer matrix composite. In various embodiments, FRP layer 130 may comprise a polymer matrix composite reinforced by fibers such as a carbon, glass, organic fibers, or combinations thereof. In various embodiments, metallic tube 110 may be comprised of a metallic material, such as steel, aluminum, or titanium, among others.

Figure 4:
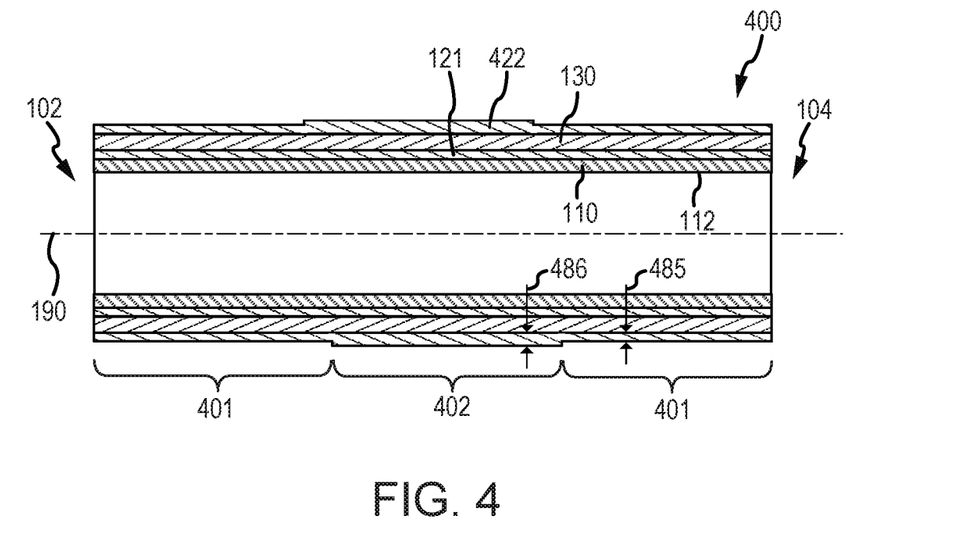
FIG. 4 illustrates a section side view of a hybrid composite tube having an outer silica fiber layer with a varying wall-thickness along the longitudinal direction of the tube, in accordance with various embodiments.

With respect to FIG. 4, elements with like element numbering, as depicted in FIG. 1A, are intended to be the same and will not necessarily be repeated for the sake of clarity.

With reference to FIG. 4, a hybrid composite tube 400 (also referred to herein as a tube or a duct) is illustrated, in accordance with various embodiments. Hybrid composite tube 400 may include a silica fiber layer 422 (also referred to herein as a second silica fiber layer). Silica fiber layer 422 may be similar to silica fiber layer 122 of FIG. 1A. Silica fiber layer 422 may comprise a varying wall-thickness along the length of (i.e., along centerline axis 190) tube 400. In this regard, silica fiber layer 422 may comprise a first section 401 comprising a first wall-thickness 485 and a second section 402 comprising a second wall-thickness 486. Second wall-thickness 486 may be greater than first wall-thickness 485. The thermal insulation of FRP layer 130 may increase with the wall-thickness of second section 402. In this regard, thermal properties of silica fiber layer 422 may vary along the length of tube 400. In this manner, thermal insulation properties of tube 400 may be varied in accordance with the relative location of tube 400 with respect to various components which may radiate lesser or greater amounts of heat.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A hybrid composite tube, comprising:
   a metallic tube;
   a first silica fiber layer positioned radially of the metallic tube;
   a fiber reinforced polymer layer positioned radially of the first silica fiber layer; and
   a second silica fiber layer positioned radially of the fiber reinforced polymer layer;

wherein the first silica fiber layer thermally insulates the fiber reinforced polymer layer and the second silica fiber layer thermally insulates the fiber reinforced polymer layer.

2. The hybrid composite tube of claim 1, wherein the metallic tube, the first silica fiber layer, the fiber reinforced polymer layer, and the second silica fiber layer, are concentric and the first silica fiber layer surrounds the metallic tube, the fiber reinforced polymer layer surrounds the first silica fiber layer, and the second silica fiber layer surrounds the fiber reinforced polymer layer.

3. The hybrid composite tube of claim 2, wherein the first silica fiber layer thermally insulates the fiber reinforced polymer layer from the metallic tube.

4. The hybrid composite tube of claim 3, wherein at least one of the first silica fiber layer and the second silica fiber layer protects the fiber reinforced polymer layer from thermal combustion.

5. The hybrid composite tube of claim 3, wherein the first silica fiber layer comprises a silica fabric.

6. The hybrid composite tube of claim 5, wherein the second silica fiber layer comprises at least one of a plurality of glass fibers coated in a silicone rubber, and a silica fabric; and
the fiber reinforced polymer layer comprises at least one of a glass fiber reinforced epoxy and a carbon fiber reinforced epoxy.

7. The hybrid composite tube of claim 3, wherein the hybrid composite tube is at least twenty five percent lighter than a fully metallic tube of similar strength.

8. The hybrid composite tube of claim 5, wherein the fiber reinforced polymer layer comprises a plurality of fibers oriented at an angle with respect to a tube axis.

9. The hybrid composite tube of claim 3, wherein the second silica fiber layer comprises a wall-thickness which varies along a long a tube axis to vary a thermal insulation property of the second silica fiber layer.

10. A hybrid composite tube, comprising:
a metallic tube;
a first silica fiber layer positioned radially of the metallic tube;
a fiber reinforced polymer layer positioned radially of the first silica fiber layer; and
a second silica fiber layer positioned radially of the fiber reinforced polymer layer.

11. The hybrid composite tube of claim 10, wherein the first silica fiber layer surrounds the metallic tube, the fiber reinforced polymer layer surrounds the first silica fiber layer, and the second silica fiber layer surrounds the fiber reinforced polymer layer, wherein the metallic tube, the first silica fiber layer, the fiber reinforced polymer layer, and the second silica fiber layer, are concentric.

12. The hybrid composite tube of claim 10, wherein the hybrid composite tube comprises at least one of a round geometry, an ovular geometry, and a polygonal geometry.

13. The hybrid composite tube of claim 11, wherein the hybrid composite tube is configured to carry a hot fluid.

14. The hybrid composite tube of claim 11, wherein the first silica fiber layer comprises a wall-thickness of between 15% and 45% of a total wall-thickness of the hybrid composite tube.

15. The hybrid composite tube of claim 11, wherein the second silica fiber layer comprises a wall-thickness of between 5% and 30% of a total wall-thickness of the hybrid composite tube.

16. The hybrid composite tube of claim 11, wherein the fiber reinforced polymer layer comprises a wall-thickness of between 30% and 80% of a total wall-thickness of the hybrid composite tube.

17. The hybrid composite tube of claim 11, wherein the metallic tube comprises a wall-thickness of between 10% and 50% of a total wall-thickness of the hybrid composite tube.

18. A method for forming a hybrid composite tube, comprising:
disposing a first silica fiber layer about a metallic tube;
disposing a fiber reinforced polymer layer about the first silica fiber layer; and
disposing a second silica fiber layer about the fiber reinforced polymer layer.

19. The method of claim 18, further comprising co-curing the first silica fiber layer and the fiber reinforced polymer layer.

20. The method of claim 18, further comprising co-curing the first silica fiber layer, the fiber reinforced polymer layer, and the second silica fiber layer.

* * * * *